US009829290B2

(12) United States Patent
Chang et al.

(10) Patent No.: US 9,829,290 B2
(45) Date of Patent: Nov. 28, 2017

(54) TOY PROJECTILE AND METHOD OF MAKING

(71) Applicant: MATTEL INC., El Segundo, CA (US)

(72) Inventors: Kin Fai Chang, Hong Kong (CN); Chun Wing Wong, Hong Kong (CN); Peter Kit Fan, Torrance, CA (US); Him Fung Hau, Hong Kong (CN)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 14/776,427

(22) PCT Filed: Mar. 14, 2014

(86) PCT No.: PCT/US2014/028092
§ 371 (c)(1),
(2) Date: Sep. 14, 2015

(87) PCT Pub. No.: WO2014/143914
PCT Pub. Date: Sep. 18, 2014

(65) Prior Publication Data
US 2016/0033242 A1    Feb. 4, 2016

Related U.S. Application Data

(63) Continuation of application No. 13/838,900, filed on Mar. 15, 2013, now Pat. No. 9,261,336.

(51) Int. Cl.
F42B 6/00      (2006.01)
B29C 69/02     (2006.01)
(Continued)

(52) U.S. Cl.
CPC ............. *F42B 6/003* (2013.01); *B29C 45/16* (2013.01); *B29C 47/0016* (2013.01);
(Continued)

(58) Field of Classification Search
CPC ........ F42B 6/003; F42B 6/10; B29C 47/0016; B29C 47/0064; B29C 47/0066;
(Continued)

(56) References Cited

U.S. PATENT DOCUMENTS 397,950 A     2/1889  White
1,918,718 A   7/1933  Samsel
(Continued)

FOREIGN PATENT DOCUMENTS

CN    201138169 Y    10/2008
DE    19519212 A1    11/1996
(Continued)

OTHER PUBLICATIONS

International Search Report for International Application No. PCT/US2014/028092, dated Jul. 16, 2014.
Written Opinion for International Application No. PCT/US2014/028092, dated Jul. 16, 2014.
Abandoned Non-Published U.S. Appl. No. 13/720,834.
Jul. 28, 2016 Office Action on U.S. Appl. No. 15/007,759.
(Continued)

Primary Examiner — Christopher M Koehler
(74) Attorney, Agent, or Firm — Edell, Shapiro & Finnan, LLC

(57) ABSTRACT

A toy projectile and method of making the toy projectile is provided herein. The toy projectile having: an elongated dart body secured to a tip assembly, the tip assembly comprising: a tip insert secured to a forward end of the elongated dart body and a tip secured to the tip insert, wherein the tip comprises a styrene ethylene butylene styrene copolymer (SEBS rubber) tip.

20 Claims, 7 Drawing Sheets

(51) Int. Cl.
*B29C 45/16* (2006.01)
*B29C 47/00* (2006.01)
*B29C 65/18* (2006.01)
*B29C 65/00* (2006.01)
*B29K 25/00* (2006.01)
*B29L 31/52* (2006.01)

(52) U.S. Cl.
CPC ...... *B29C 47/0064* (2013.01); *B29C 47/0066* (2013.01); *B29C 65/18* (2013.01); *B29C 66/301* (2013.01); *B29C 69/02* (2013.01); *B29K 2025/08* (2013.01); *B29L 2031/529* (2013.01)

(58) Field of Classification Search
CPC ....... B29C 45/16; B29C 65/18; B29C 66/301; B29C 69/02; B29L 2031/529; B29K 2025/08
See application file for complete search history.

(56) References Cited

U.S. PATENT DOCUMENTS

| | | | |
|---|---|---|---|
| 2,025,123 A | 12/1935 | Rahbek | |
| 2,099,908 A | 11/1937 | Rosengarten | |
| 2,119,524 A | 6/1938 | Char | |
| 2,145,434 A | 1/1939 | Herbert | |
| 2,592,078 A | 4/1952 | Taylor et al. | |
| 2,611,999 A | 9/1952 | Mikolay | |
| 2,683,037 A | 7/1954 | Ruczynski et al. | |
| 2,807,469 A | 9/1957 | Swartz | |
| 2,821,397 A | 1/1958 | Hartigan, Sr. | |
| 2,828,966 A | 4/1958 | Swartz | |
| 2,875,101 A | 2/1959 | Ehrlich | |
| 3,032,345 A | 5/1962 | Lemelson | |
| 3,167,440 A | 1/1965 | McVicker et al. | |
| 3,425,695 A | 2/1969 | Kestenbaum | |
| 3,494,070 A | 2/1970 | Lemelson | |
| 3,557,768 A | 1/1971 | Lake | |
| 3,607,794 A | 9/1971 | Abbotson et al. | |
| 3,634,280 A | 1/1972 | Dean | |
| 3,676,387 A | 7/1972 | Lindlof | |
| 3,801,102 A * | 4/1974 | Lohr | F42B 6/003 29/450 |
| 3,923,310 A * | 12/1975 | Lowy | F42B 6/003 473/586 |
| 3,954,266 A | 5/1976 | Carrano et al. | |
| 3,997,162 A | 12/1976 | Scullin | |
| 4,072,589 A | 2/1978 | Golda et al. | |
| D253,663 S | 12/1979 | Cagan et al. | |
| 4,236,715 A | 12/1980 | Middlebrook | |
| 4,257,613 A | 3/1981 | Thor | |
| 4,396,196 A | 8/1983 | Drennan | |
| 4,618,213 A | 10/1986 | Chen | |
| 4,877,566 A | 10/1989 | Cha | |
| 4,884,989 A | 12/1989 | Wong | |
| 5,066,017 A * | 11/1991 | Kurland | A63B 60/40 473/572 |
| 5,090,643 A | 2/1992 | Spears | |
| 5,150,909 A * | 9/1992 | Fitzwater | F42B 7/08 102/522 |
| 5,322,727 A | 6/1994 | Yankus et al. | |
| 5,373,833 A | 12/1994 | D'Andrade | |
| 5,384,384 A | 1/1995 | Inoue et al. | |
| 5,498,004 A * | 3/1996 | Mariella | F42B 6/003 29/527.2 |
| 5,559,186 A | 9/1996 | Fujii et al. | |
| 5,573,981 A | 11/1996 | Sato | |
| 5,683,285 A | 11/1997 | Wong | |
| 5,701,878 A | 12/1997 | Moore et al. | |
| 5,724,954 A | 3/1998 | Smith | |
| 5,791,326 A | 8/1998 | Brown et al. | |
| 5,916,008 A | 6/1999 | Wong | |
| 5,916,949 A | 6/1999 | Shapero et al. | |
| 5,928,049 A | 7/1999 | Hudson | |
| 5,944,006 A | 8/1999 | Moore et al. | |
| 5,972,092 A | 10/1999 | Cordova | |
| 6,083,127 A | 7/2000 | O'Shea | |
| 6,117,537 A | 9/2000 | Butters et al. | |
| 6,134,856 A | 10/2000 | Khan et al. | |
| 6,159,117 A | 12/2000 | Chan | |
| 6,180,255 B1 | 1/2001 | Valentini et al. | |
| 6,299,596 B1 | 10/2001 | Ding | |
| 6,359,057 B1 | 3/2002 | Li | |
| 6,398,860 B1 | 6/2002 | Ona et al. | |
| 6,444,728 B1 | 9/2002 | Yuyama | |
| 6,509,391 B2 | 1/2003 | Gothjaelpsen et al. | |
| 6,521,325 B1 | 2/2003 | Engle et al. | |
| 6,527,616 B1 | 3/2003 | Li | |
| 6,533,637 B1 | 3/2003 | Liao | |
| 6,613,419 B2 | 9/2003 | Ohbayashi et al. | |
| 6,713,624 B1 | 3/2004 | Doane, Jr. et al. | |
| 6,743,515 B1 | 6/2004 | Müller et al. | |
| 6,791,817 B2 | 9/2004 | Allison et al. | |
| 6,881,781 B1 | 4/2005 | Gamba | |
| 6,884,833 B2 | 4/2005 | Chheang et al. | |
| 6,933,344 B2 | 8/2005 | Shah et al. | |
| 7,081,498 B2 | 7/2006 | Moeller et al. | |
| 7,135,330 B2 | 11/2006 | Ohtaka | |
| 7,287,526 B1 | 10/2007 | Bligh et al. | |
| 7,364,521 B2 | 4/2008 | Yang | |
| 7,470,203 B1 | 12/2008 | Stillinger | |
| 7,481,209 B1 | 1/2009 | Bligh et al. | |
| 7,551,419 B2 | 6/2009 | Pelrine et al. | |
| 7,554,787 B2 | 6/2009 | Pelrine et al. | |
| 7,604,556 B2 | 10/2009 | Witzigreuter | |
| 7,695,811 B2 | 4/2010 | Northen et al. | |
| 7,700,151 B2 | 4/2010 | Paul et al. | |
| 7,762,362 B2 | 7/2010 | Cutkosky et al. | |
| 7,773,363 B2 | 8/2010 | Pelrine et al. | |
| 7,775,918 B2 | 8/2010 | Tsang | |
| 7,861,657 B2 | 1/2011 | Danon et al. | |
| 7,872,850 B2 | 1/2011 | Pelrine et al. | |
| 8,012,049 B1 * | 9/2011 | Walterscheid | F42B 6/003 473/572 |
| 8,057,891 B2 | 11/2011 | Cheng et al. | |
| 8,517,004 B2 | 8/2013 | Walterscheid | |
| 8,616,934 B1 | 12/2013 | Kern | |
| 8,633,269 B2 | 1/2014 | Cordova | |
| D733,806 S | 7/2015 | Hedeen et al. | |
| 9,261,336 B2 | 2/2016 | Chang et al. | |
| 2003/0153417 A1 | 8/2003 | Barrie et al. | |
| 2003/0207065 A1 | 11/2003 | Sher et al. | |
| 2004/0026863 A1 | 2/2004 | Cho | |
| 2004/0048018 A1 | 3/2004 | Pearce | |
| 2004/0224104 A1 | 11/2004 | de Vries et al. | |
| 2004/0249089 A1 | 12/2004 | Yeung | |
| 2006/0046877 A1 * | 3/2006 | Gajda | F42B 6/10 473/572 |
| 2006/0111015 A1 | 5/2006 | Chernick et al. | |
| 2007/0100052 A1 | 5/2007 | Terry Lee et al. | |
| 2007/0238815 A1 | 10/2007 | Lee et al. | |
| 2007/0290446 A1 | 12/2007 | Amick | |
| 2008/0008849 A1 | 1/2008 | Mazurek et al. | |
| 2008/0287575 A1 | 11/2008 | Lee et al. | |
| 2009/0050010 A1 * | 2/2009 | Tsang | F42B 6/10 102/502 |
| 2009/0192250 A1 | 7/2009 | Ijichi et al. | |
| 2009/0260742 A1 | 10/2009 | Schmatloch et al. | |
| 2010/0136281 A1 | 6/2010 | Sitti et al. | |
| 2010/0190011 A1 | 7/2010 | Cheng et al. | |
| 2010/0190887 A1 | 7/2010 | Wai | |
| 2010/0204667 A1 | 8/2010 | Chakravarthy | |
| 2010/0210794 A1 | 8/2010 | Frese et al. | |
| 2010/0271746 A1 | 10/2010 | Pelrine et al. | |
| 2010/0285721 A1 | 11/2010 | Ma | |
| 2011/0104430 A1 | 5/2011 | Mehrabi et al. | |
| 2011/0110010 A1 | 5/2011 | Pelrine et al. | |
| 2011/0193362 A1 | 8/2011 | Prahlad et al. | |
| 2011/0277653 A1 | 11/2011 | Nguyen | |
| 2012/0216949 A1 | 8/2012 | Stachowski et al. | |

(56) References Cited

U.S. PATENT DOCUMENTS

2012/0288680 A1 11/2012 Nguyen et al.
2015/0141181 A1 5/2015 Chia
2016/0282092 A1 9/2016 Chang et al.

FOREIGN PATENT DOCUMENTS

| DE | 19745700 A1 | 4/1999 |
|---|---|---|
| FR | 2880944 A1 | 7/2006 |
| GB | 2072682 A | 10/1981 |
| JP | 50032238 A | 3/1975 |
| JP | 9-187571 | 7/1997 |
| MX | 2003010235 A1 | 6/2005 |
| WO | 9420984 A1 | 9/1994 |
| WO | 2004088236 | 10/2004 |
| WO | 2012/116193 A1 | 8/2012 |
| WO | 2012/155259 A1 | 11/2012 |

OTHER PUBLICATIONS

Oct. 28, 2015 Office Action on Abandoned Non-Published U.S. Appl. No. 14/553,198.
May 30, 2014 Office Action on Abandoned Non-Published U.S. Appl. No. 13/720,834.
Abandoned Non-Published U.S. Appl. No. 14/553,198.
Abandoned Non-Published U.S. Appl. No. 15/056,038.
International Search Report for International Application No. PCT/US2014/028092; Date of Mailing: Jul. 16, 2014.
Pending Design U.S. Appl. No. 29/482,056.
Written Opinion for International Application No. PCT/US2014/028092; Date of Mailing: Jul. 16, 2014.
Jun. 22, 2017 Non Final Office Action on U.S. Appl. No. 15/007,759.
Dec. 19, 2016 Chinese Office Action for Chinese Patent Application 201480028092.2 (with attached translation).

\* cited by examiner

TOY PROJECTILE AND METHOD OF MAKING

CROSS REFERENCE TO RELATED APPLICATIONS

This application claims the benefit of U.S. patent application Ser. No. 13/838,900 filed Mar. 15, 2013, the entire contents of which are incorporated herein by reference thereto.

BACKGROUND

Various embodiments of the present invention relate to a toy projectile or dart and a method of making the toy projectile or dart.

Darts or toy projectiles have been used in toy guns or other toys to provide an enhanced play factor to the toy guns or toys. As with any toy projectile, it is desirable to provide the same with a blunt soft end as well as certain characteristics that allow for durability and continued use.

Accordingly, it is desirable to provide a toy dart or toy projectile that is easy to manufacture and have robust characteristics as well as providing for the aforementioned safety factures.

SUMMARY OF THE INVENTION

In one embodiment, a toy projectile is provided, the toy projectile having: an elongated dart body secured to a tip assembly, the tip assembly comprising: a tip insert secured to a forward end of the elongated dart body and a tip secured to the tip insert, wherein the tip comprises a styrene ethylene butylene styrene copolymer (SEBS rubber) tip.

In another embodiment, a toy projectile is provided, the toy projectile having: an elongated dart body; a tip assembly, secured to the forward end of the elongated dart body, the tip assembly comprising: a tip insert and a tip portion molded thereto, the tip insert having a plurality of annular features extending from an exterior surface of the tip insert, wherein at least one of the plurality of annular features is covered by the tip portion when the tip portion is molded onto the tip insert and wherein at least one other of the plurality of annular features is only covered by a forward portion of the elongated dart body when it is secured to tip assembly. In one embodiment, the tip portion can be co-molded with the tip insert. In another embodiment, the tip portion can be insert molded with the tip insert.

In yet another embodiment, a method of securing a SEBS rubber tip to an extruded dart body is provided. The method including the steps of: forming a tip assembly by inserting a tip insert into a die of an injection molding machine, wherein the tip insert has a central opening extending therethrough and a plurality of features extending from an exterior surface of the tip insert; insert molding a SEBS rubber material wherein the die of the injection molding machine is configured to allow a portion of the SEBS rubber material to extend into a portion of the central opening and cover some of the plurality of features extending from the exterior surface of the tip insert; removing the tip assembly from the injection molding machine; and securing a forward end of an extruded dart body to at least one of the plurality of features of the tip insert that is not covered by the SEBS rubber material.

In yet another embodiment, a method of securing a SEBS rubber tip to an extruded dart body is provided. The method including the steps of: forming a tip assembly, wherein the tip insert has a central opening extending therethrough and a plurality of features extending from an exterior surface of the tip insert; co-molding a SEBS rubber material with the tip insert wherein the SEBS rubber material covers some of the plurality of features extending from the exterior surface of the tip insert; and securing a forward end of an extruded dart body to at least one of the plurality of features of the tip insert that is not covered by the SEBS rubber material.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Figure 1:
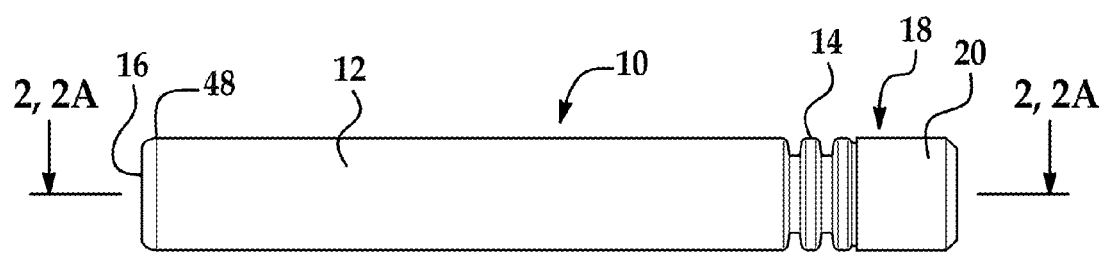
FIG. 1 is a view of a dart or projectile in accordance with an exemplary embodiment of the present invention.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Referring now to the FIGS. and in particular FIGS. 1-5, a dart or projectile 10 constructed in accordance with an exemplary embodiment of the present invention is illustrated. Dart or projectile 10 has an elongated tubular body portion 12 which has a forward end or front end 14 and a rearward or rear end 16. Rearward or rear end 16 has an opening 17 (see FIG. 2B) that extends into an opening or cavity 19 of the elongated tubular body portion 12. Referring back to FIG. 1, secured to the forward end 14 is a tip assembly 18. Tip assembly 18 has a tip portion 20 and a tip insert 22. The tip portion 20 is secured to a first portion of the tip insert 22 and a second portion of the tip insert 22 is secured to the forward end 14 of the elongated tubular body portion 12.

Accordingly, tip insert 22 provides a means for securing the tip portion 20 to the forward end 14 of the elongated tubular body portion 12. In one exemplary embodiment, tip insert 22 is configured to have an inner opening 24 extending therethrough. In addition, an exterior surface 26 of the tip insert 22 is configured to have a plurality of features or annular rings 28 extending away from the exterior surface 26 of the tip insert 22. In one embodiment, the plurality of features or annular rings 28 provides securement features to which the tip 20 and the forward end 14 are secured thereto. Still further, the plurality of features or annular rings also provide a plurality of grooves 30 located between the annular rings. The features or annular rings 28 as well as the grooves 30 located therebetween provide a mechanism for rigidly securing the forward end 14 to the tip assembly 18. In one implementation and as the material of forward end 14 is pushed between annular rings 28 and then cooled, an interlock of the tip assembly 18 and the tubular body portion 12 is formed.

Figure 6:
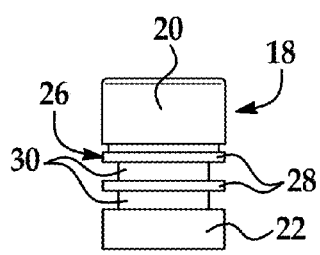
FIG. 6 is a view of a tip assembly constructed in accordance with one non-limiting exemplary embodiment of the present invention.
Figure 7:
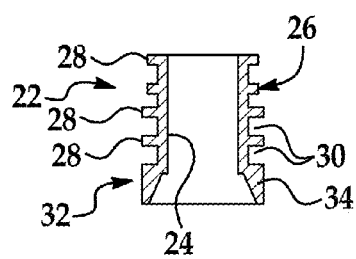
FIG. 7 is a cross-sectional view of an insert constructed in accordance with one non-limiting exemplary embodiment of the present invention.
Figure 8:
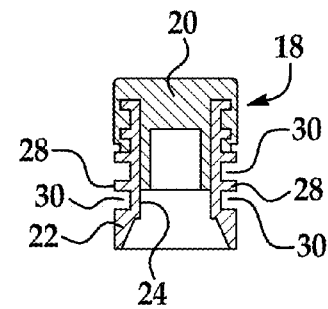
FIG. 8 is a cross-sectional view a tip assembly constructed in accordance with one non-limiting exemplary embodiment of the present invention.

FIG. 6 illustrates a tip assembly 18 formed in accordance with one non-limiting exemplary embodiment of the present invention. FIG. 7 is a cross-sectional view of the tip insert 22 formed in accordance with one non-limiting exemplary embodiment of the present invention while FIG. 8 is a cross-sectional view of the tip insert 22 with the tip 20 secured thereto. As illustrated, the plurality of features or annular rings 28 provides securement features to which the tip 20 and the forward end 14 are secured thereto. Still further, the plurality of features or annular rings 28 also provide a plurality of grooves 30 located between the annular rings. In accordance with one embodiment, the height or distance of the annular rings 28 may vary. In addition, a rearward end 32 of the tip insert 22 may be formed with a flange portion 34 which provides additional rigidity to the tip insert and/or tip assembly and in particular to the area that is secured to the forward end 14 of the elongated dart body 12.

In accordance with one non-limiting exemplary embodiment, the tip insert 22 is formed from the following material TPR Thermoflex ME1385 via an injection molding process. Of course, other equivalent materials for forming the tip insert are considered to be within the scope of exemplary embodiments of the present invention. In one non-limiting exemplary embodiment, the core part or tip insert 22, was shot at a temp of 225° C. and the shot pressure was 65 bar for a cycle time of 40 seconds. Of course, other temperatures, times and pressures greater and less than the aforementioned values are considered to be within the scope of various embodiments of the present invention.

In accordance with one non-limiting exemplary embodiment, the tip 20 is formed from a styrene ethylene butylene styrene copolymer (SEBS rubber) or more particularly the following material TPR Thermoflex ME1927 via an injection molding process. Of course, other equivalent materials for forming the tip are considered to be within the scope of exemplary embodiments of the present invention. In one non-limiting exemplary embodiment, the tip part was shot at a temp of 225° C. and the shot pressure was 50 bar for a cycle time of 60 seconds. Of course, other temperatures, times and pressures greater and less than the aforementioned values are considered to be within the scope of various embodiments of the present invention.

In accordance with one non-limiting exemplary embodiment, the elongated tubular body portion 12 is formed from an extrusion process wherein the tubular body portion is formed from a polyethylene which in one embodiment comprises 60% LDPE and 40% HDPE. Of course, other equivalent materials and combinations thereof are considered to be within the scope of exemplary embodiments of the present invention.

Figure 9:
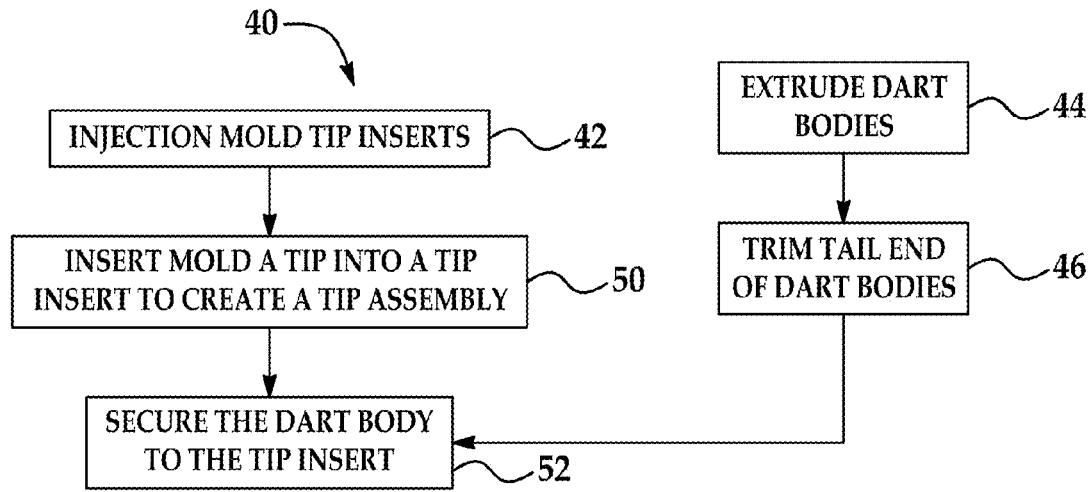
FIG. 9 is a flowchart illustrating a method or process for forming a forming a dart or projectile in accordance with one non-limiting exemplary embodiment of the present invention.

Referring now to FIG. 9, a flowchart 40 illustrating one non-limiting method for forming the dart or projectiles 10 is provided. At box 42 at least one or a plurality of tip inserts 22 are formed by the aforementioned injection molding process. Simultaneously, previously or afterwards at least one or a plurality of elongated tubular dart body portion 12 are formed by an extrusion process at step 44. During this step or process the tubular body portion 12 is formed from an extrusion machine wherein an elongated member is extruded from the aforementioned materials and once cooled, the extruded member is cut into the desired lengths for use as tubular body portion 12.

Figure 2:
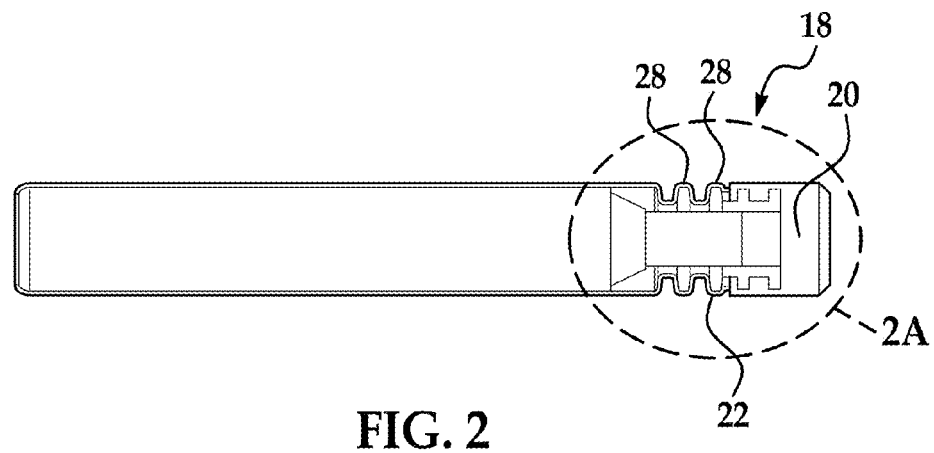
FIG. 2 is a cross-sectional view of the dart or projectile along the lines 2-2 of FIG. 1.
Figure 2A:
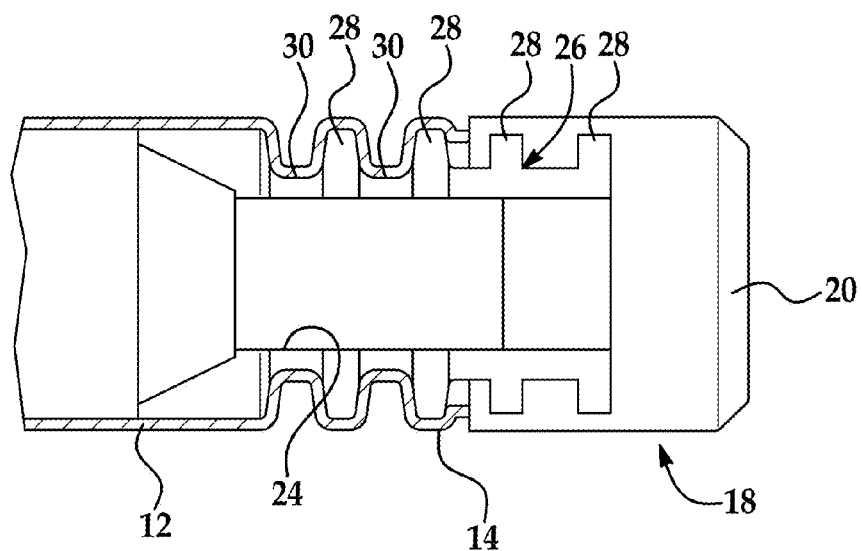
FIG. 2A is a cross-sectional view of the dart or projectile along the lines 2A-2A of FIG. 1.
Figure 2B:
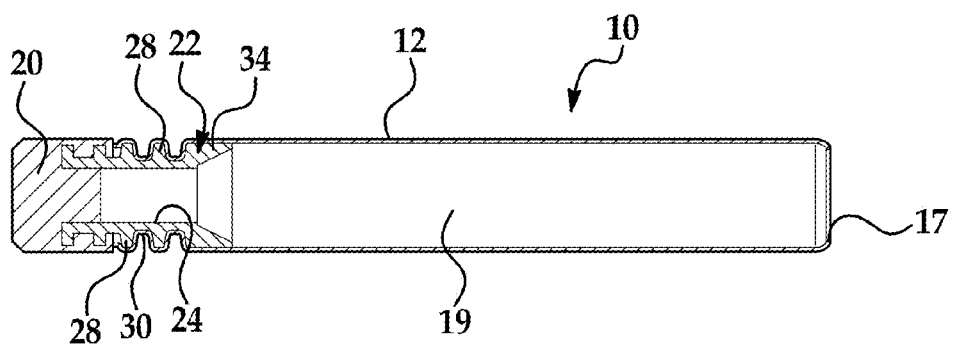
FIG. 2B is an enlarged portion of FIG. 2.
Figure 3A:
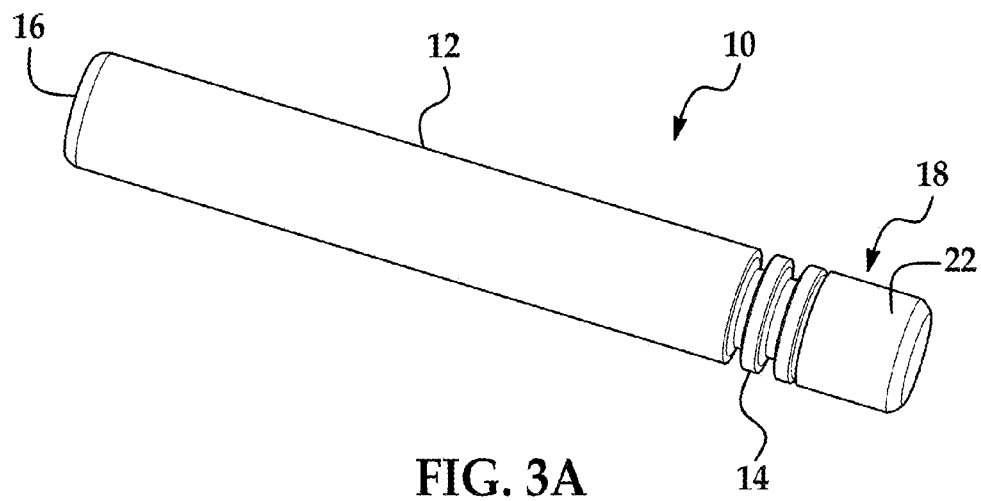
FIGS. 3A and 3B are front and rear perspective views of the dart or projectile illustrated in FIG. 1 in accordance with an exemplary embodiment of the present invention.
Figure 3B:
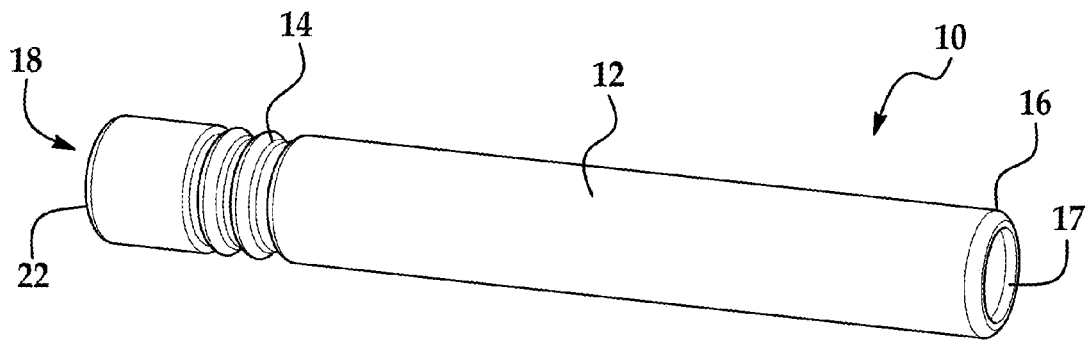
Figure 4:
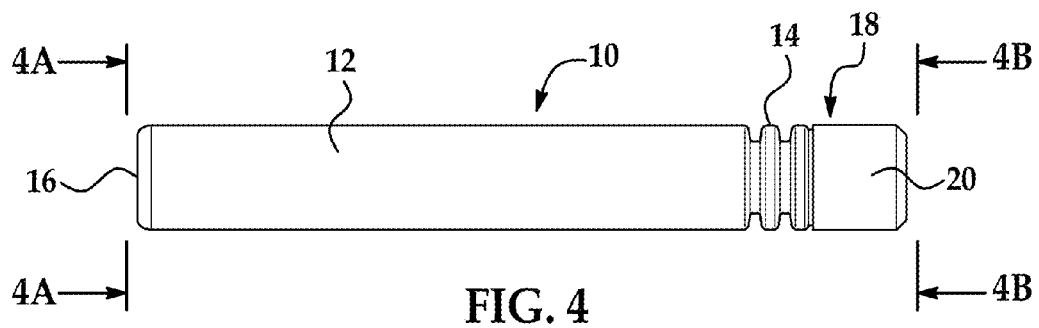
FIGS. 4 and 5 are side views of the dart or projectile in accordance with an exemplary embodiment of the present invention.
Figure 4A:
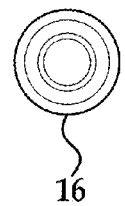
FIG. 4A is a view along lines 4A-4A of FIG. 4 or a rear view of the dart or projectile of FIG. 1 in accordance with an exemplary embodiment of the present invention.
Figure 4B:
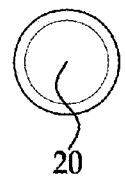
FIG. 4B is a view along lines 4B-4B of FIG. 4 or a front view of the dart or projectile of FIG. 1 in accordance with an exemplary embodiment of the present invention.
Figure 5:
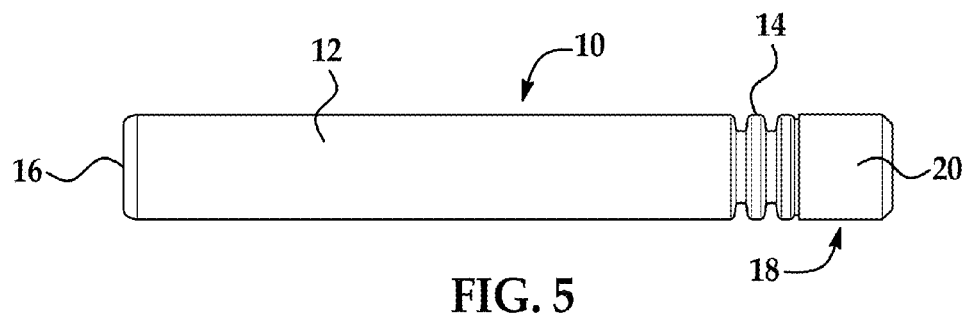

At step 46, the rear end or tail end 16 of the elongated tubular dart body portion proximate to opening 17 is trimmed to have a curved or rounded surface 48 (see at least FIG. 1). Once trimmed, the elongated tubular body portion 12 is ready to be secured to the tip assembly 18. In an alternative embodiment step 46 may be eliminated.

At a step 50, the molded tip insert 22 is inserted into an injection molding machine wherein the tip portion 20 is insert molded onto a portion of the tip insert 22 as described above and illustrated in the attached FIGS. Once this process is complete, the tip assembly 18 is now formed.

After conclusion of the process at step 50, the form tip assemblies 18 are now secured to the elongated body portions 12 via a heat treating process which occurs at step 52.

Figure 9A:
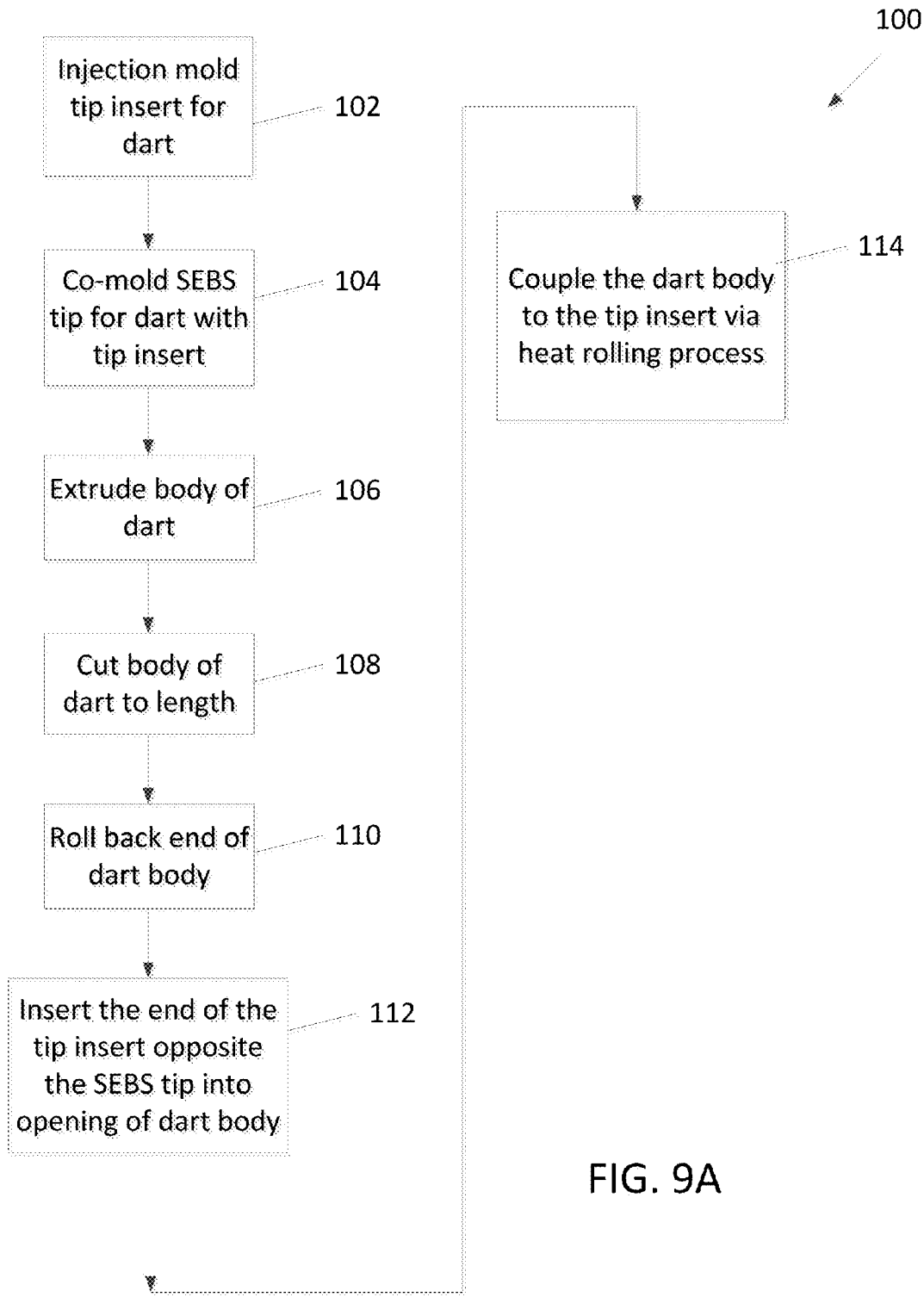
FIG. 9A is a flowchart illustrating an alternative method or process for forming a dart or projectile in according with another embodiment of the present invention.

Referring to FIG. 9A, a flowchart illustrating another method 100 for forming a dart or projectile according to the present invention is illustrated. As shown, the method 100 includes several steps that are performed. In step 102, the tip insert for the dart is injection molded. Subsequently, in step 104, a SEBS tip for the dart is co-molded with the tip insert. In one implementation of this process, the mold in which the tip insert is injection molded is rotated to reposition it so that the SEBS material can be inserted into the mold to be co-molded with the tip insert. In one exemplary process, the mold is rotated 180 degrees between step 102 and step 104.

In step 106, the body of the dart is formed. In this process, the dart body is extruded in a substantially cylindrical form with an opening or channel therethrough. In step 108, the extruded body of the dart is cut by a machine in an automated process. The dart body has a desired length and any excess material beyond that length is trimmed. In step 110, the end 17 of the dart body is rolled to form a slightly curved or curled end as shown in the drawings.

In step 112, the tip insert is engaged with the dart body. In particular, the tip insert has a first end to which SEBS material has been co-molded and a second end opposite the first end. The second end of the tip insert is inserted into an open end of the dart body. The tip insert is inserted so that a few of the grooves on the tip insert are located inside the dart body. In step 114, the dart body is coupled to the tip insert via a heat rolling process. In this process, heat and pressure are applied to the dart body via a tool, such as a pair of rollers, that is aligned with some of the grooves of the tip insert. The dart body is rotated about its longitudinal axis so that the tool remains in contact with the dart body as it rotates, thereby causing the dart body to conform to the profile of the tip insert and be pushed into the grooves of the tip insert. When the dart body has been coupled to the tip insert via this process, the forming of the dart is complete.

Figure 10:
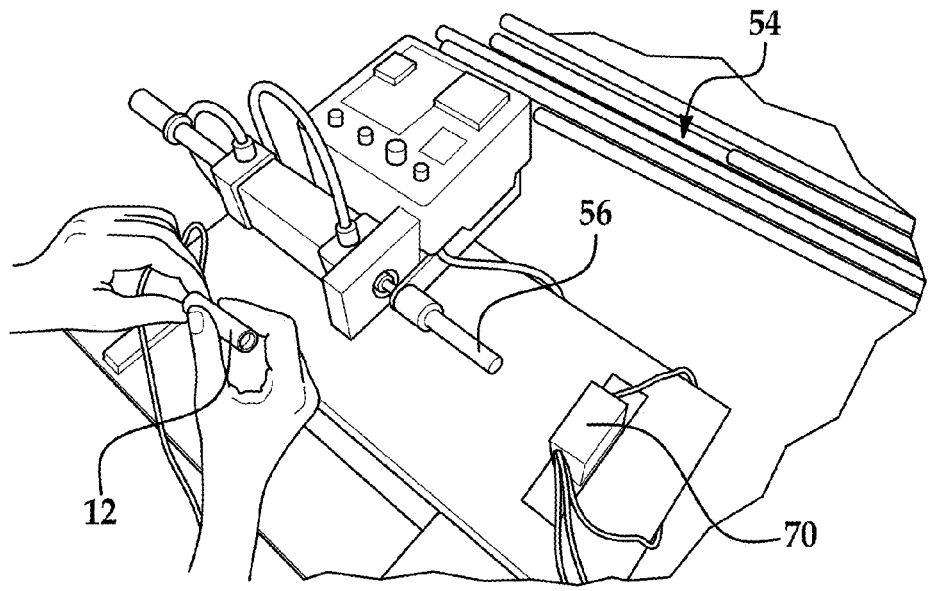
FIGS. 10 and 11 illustrate an apparatus for trimming a tail or rearward end of the dart or projectile.
Figure 11:
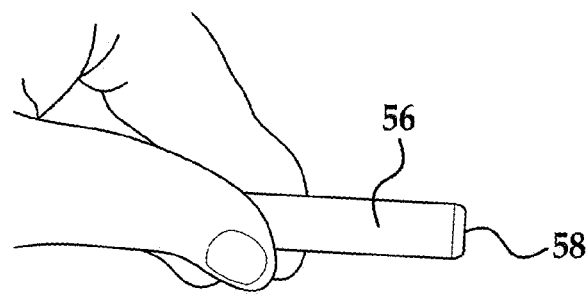

Referring now to FIGS. 10 and 11, apparatus for use in one embodiment of a dart body forming process according to the invention are illustrated. As shown, an apparatus 54 for use in the trimming step 46 is illustrated. Apparatus 54 has a plunger 56 onto which the extruded elongated body 12 is placed and an end portion 58 of plunger 56 has corresponding rounded ends which form the rounded ends or end 48 of the elongated body portion 12 when plunger 56 is moved towards a copper plate or other of material 70 which is heated in order to manipulate or trim the extruded elongated body 12 to have a trimmed end or rounded surface 48.

Figure 12:
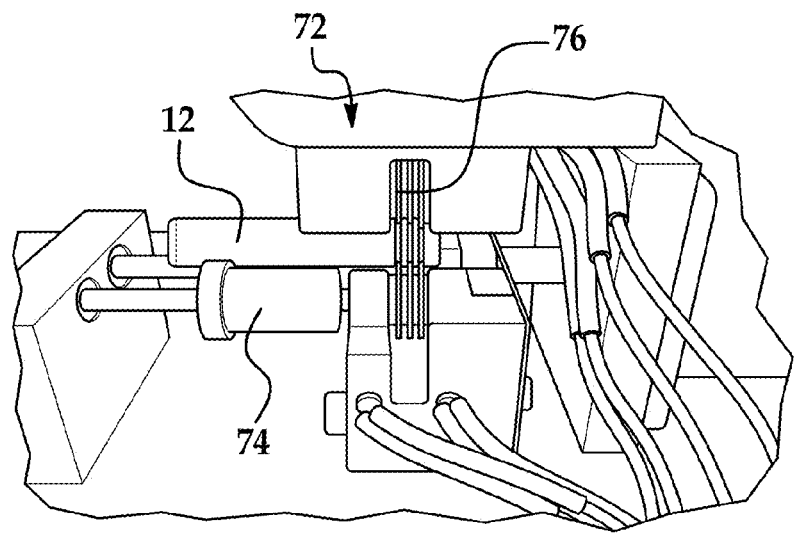
FIG. 12 illustrates an apparatus for securing an extruded dart body to a tip assembly.

FIG. 12 illustrates an apparatus 72 for use in step 52 wherein the elongated body 12 with the tip insert inserted into a forward end 14 of the elongated body 12 is placed between a pair of rollers 74 which rotate the same. A heated copper roller assembly or other equivalent material 76 applies heat and pressure to the forward end 14 of the elongated body such that portions of the same are now pushed into the grooves 30 of tip insert 22 so that the elongated body 12 is now secured to the tip assembly 18 and the dart or projectile 10 is formed.

Figure 13:
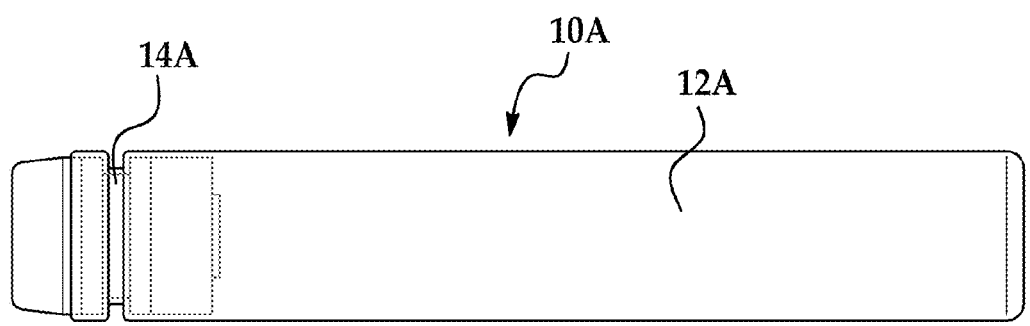
FIG. 13 illustrates a dart or projectile formed in accordance with an alternative exemplary embodiment of the present invention.
Figure 13A:
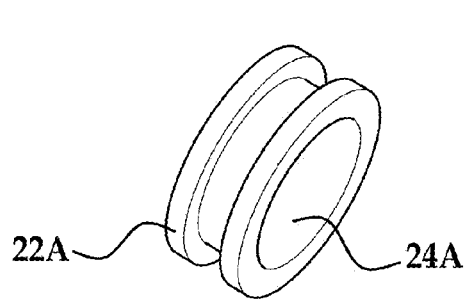
FIGS. 13A-13D illustrate portions of the dart or projectile illustrated in FIG. 13.
Figure 13B:
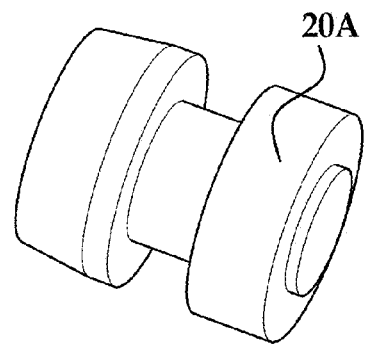
Figure 13C:
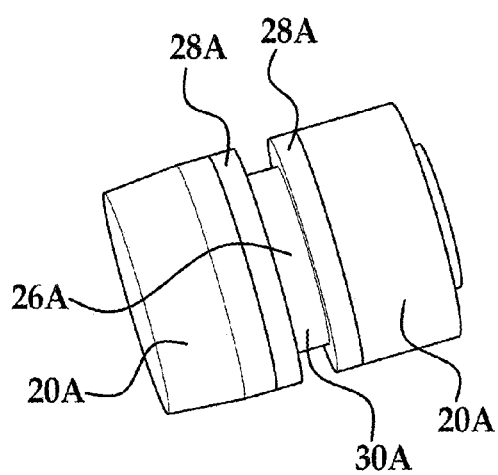
Figure 13D:
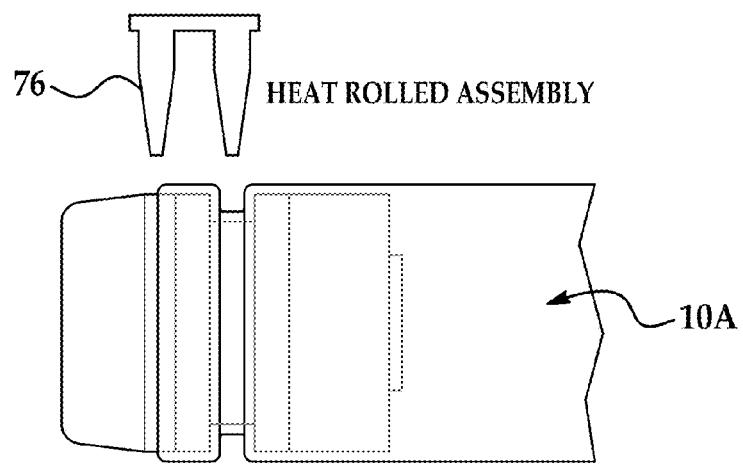

Referring now to the FIGS. 13-13D an alternative exemplary embodiment of the present invention is illustrated. Here the tip insert 22A and the tip portion 20A have alternative configurations. In this embodiment, after the insert molding process the tip 20A or material used to form tip 20A extends completely through the central opening 24A of the tip insert 22A and is received within the central opening of the elongated tubular body 12A. In addition and in this embodiment, the forward end 14A of the elongated body 12A is formed onto features 28A and groove 30A as well as a portion of tip portion 20A. Of course, numerous other configurations are considered to be within the scope of exemplary embodiments of the present invention and the above embodiments are merely examples of various embodiments of the present invention.

As discussed above, the insert molding process of forming the tip and the tip insert is only one process used in the forming of a dart according to the present invention. A dart may be formed using the injection molding and co-molding processes described above as well. The heat rolling process is used to couple the tip insert to the dart body as described above as well.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of securing a styrene ethylene butylene styrene copolymer (SEBS) tip to an extruded dart body, comprising:
    forming a tip assembly by inserting a tip insert into a die of an injection molding machine, wherein the tip insert has a central opening extending therethrough and a plurality of individual features extending from an exterior surface of the tip insert;
    insert molding a SEBS material wherein the die of the injection molding machine is configured to allow a portion of the SEBS material to extend into a portion of the central opening and cover some of the plurality of features extending from the exterior surface of the tip insert;
    removing the tip assembly from the injection molding machine; and
    securing a forward end of the extruded dart body to at least one of the plurality of individual features of the tip insert that is not covered by the SEBS material.

2. The method as in claim 1, wherein the forward end of the extruded dart body is secured to the tip insert by a heat treating process.

3. The method as in claim 1, wherein a portion of the forward end of the extruded dart body secured to the tip assembly is received within a groove located between at least two of the plurality of individual features of the tip insert that are not covered by the SEBS material.

4. The method as in claim 1, wherein the plurality of individual features extend outwardly from the exterior surface of the tip insert.

5. The method as in claim 1, further comprising: cutting to length the extruded dart body.

6. The method as in claim 5, further comprising: trimming a rearward end of the extruded dart body to form a curved or rounded end.

7. The method as in claim 2, wherein the heat treating process includes a heat rolling process that rotates the body of the dart.

8. A method of securing a styrene ethylene butylene styrene copolymer (SEBS) tip to an extruded dart body, comprising:
    forming a tip assembly by:
        injection molding a tip insert, wherein the tip insert has a central opening and a plurality of individual features extending from an exterior surface of the tip insert;

co-molding a SEBS material with the tip insert, wherein a portion of the SEBS material extends into a portion of the central opening and covers some of the plurality of individual features extending from the exterior surface of the tip insert;

extruding a body of the dart; and coupling the body of the dart to the tip insert via a heat treating process.

9. The method as in claim 8, wherein the coupling the body of the dart to the tip insert includes securing a forward end of the extruded dart body to at least one of the plurality of individual features of the tip insert that is not covered by the SEBS material.

10. The method as in claim 8, wherein the heat treating process includes a heat rolling process that rotates the body of the dart.

11. The method as in claim 8, further comprising: cutting to length the body of the dart.

12. The method as in claim 11, further comprising: trimming a rearward end of the body of the dart to form a curved or rounded end.

13. The method as in claim 8, wherein the plurality of individual features extend outwardly from the exterior surface of the tip insert.

14. The method as in claim 13, wherein the coupling the body of the dart to the tip insert includes securing a forward end of the extruded dart body to a groove located between at least two of the plurality of outwardly extending individual features of the tip insert that are not covered by the SEBS material.

15. A method of securing a styrene ethylene butylene styrene copolymer (SEBS) tip to a dart body, comprising:

forming a tip assembly by:

molding a tip insert, wherein the tip insert has a central opening and a plurality of individual features extending from an exterior surface of the tip insert;

molding a SEBS material with the tip insert, wherein a portion of the SEBS material extends into a portion of the central opening and covers some of the plurality of individual features extending from the exterior surface of the tip insert;

forming a body of the dart; and coupling the body of the dart to the tip insert.

16. The method as in claim 15, wherein the body of the dart is formed by extrusion.

17. The method as in claim 15, wherein the molding of the tip insert is injection molding.

18. The method as in claim 15, wherein the molding the SEBS material with the tip insert is co-molding.

19. The method as in claim 15, wherein the coupling the body of the dart to the tip insert comprises a heat treating process.

20. The method as in claim 15, wherein the plurality of individual features extend outwardly from the exterior surface of the tip insert, and wherein the coupling the body of the dart to the tip insert includes securing a forward end of the dart body to a groove located between at least two of the plurality of outwardly extending individual features of the tip insert that are not covered by the SEBS material.

* * * * *